US008945793B2

(12) United States Patent
Blennow et al.

(10) Patent No.: US 8,945,793 B2
(45) Date of Patent: Feb. 3, 2015

(54) CERIA AND STRONTIUM TITANATE BASED ELECTRODES

(75) Inventors: Peter Blennow, Malmö (SE); Mogens Mogensen, Lynge (DK); Kent Kammer Hansen, Ølstykke (DK)

(73) Assignee: Technical University of Denmark, Lyngby (DK)

( * ) Notice: Subject to any disclaimer, the term of this patent is extended or adjusted under 35 U.S.C. 154(b) by 1319 days.

(21) Appl. No.: 12/199,649

(22) Filed: Aug. 27, 2008

(65) Prior Publication Data

US 2009/0061284 A1    Mar. 5, 2009

(30) Foreign Application Priority Data

Aug. 31, 2007 (DK) .................................. 2007 01246

(51) Int. Cl.
*H01M 4/02* (2006.01)
*H01M 4/36* (2006.01)
(Continued)

(52) U.S. Cl.
CPC ............... *C04B 35/47* (2013.01); *C04B 35/488* (2013.01); *C04B 35/50* (2013.01); *H01M 4/8621* (2013.01); *H01M 4/8885* (2013.01); *C04B 2235/3213* (2013.01); *C04B 2235/3224* (2013.01); *C04B 2235/3225* (2013.01); *C04B 2235/3229* (2013.01); *C04B 2235/3236* (2013.01); *C04B 2235/3239* (2013.01); *C04B 2235/3246* (2013.01); *C04B 2235/3251* (2013.01); *C04B 2235/3279* (2013.01); *C04B 2235/443* (2013.01); *C04B 2235/616* (2013.01); *C04B 2235/652* (2013.01); *C04B 2235/6582* (2013.01);
(Continued)

(58) Field of Classification Search
USPC .......................... 501/126; 429/403, 523, 400
See application file for complete search history.

(56) References Cited

U.S. PATENT DOCUMENTS 3,460,991 A * 8/1969 White, Jr. ....................... 429/466
4,490,444 A * 12/1984 Isenberg ....................... 429/466
(Continued)

FOREIGN PATENT DOCUMENTS

CN  1739213 A  2/2006
CN  1985397 A  6/2007
(Continued)

OTHER PUBLICATIONS

Atkinson et al. [Atkinson] (Atkinson et al Nature, Materials vol. 3 Jan. 2004 pp. 17-27).*
(Continued)

*Primary Examiner* — Patrick Ryan
*Assistant Examiner* — Aaron Greso
(74) *Attorney, Agent, or Firm* — Dickstein Shapiro LLP

(57) ABSTRACT

A ceramic anode structure obtainable by a process comprising the steps of: (a) providing a slurry by dispersing a powder of an electronically conductive phase and by adding a binder to the dispersion, in which said powder is selected from the group consisting of niobium-doped strontium titanate, vanadium-doped strontium titanate, tantalum-doped strontium titanate, and mixtures thereof, (b) sintering the slurry of step (a), (c) providing a precursor solution of ceria, said solution containing a solvent and a surfactant, (d) impregnating the resulting sintered structure of step (b) with the precursor solution of step (c), (e) subjecting the resulting structure of step (d) to calcination, and (f) conducting steps (d)-(e) at least once.

11 Claims, 5 Drawing Sheets

(51) Int. Cl.

| | | |
|---|---|---|
| *H01M 8/00* | (2006.01) | |
| *H01M 8/22* | (2006.01) | |
| *C08B 35/00* | (2006.01) | |
| *C04B 35/47* | (2006.01) | |
| *C04B 35/488* | (2006.01) | |
| *C04B 35/50* | (2006.01) | |
| *H01M 4/86* | (2006.01) | |
| *H01M 4/88* | (2006.01) | |
| *H01M 8/12* | (2006.01) | |

(52) U.S. Cl.
CPC ......... *C04B2235/79* (2013.01); *C04B 2235/80* (2013.01); *C04B 2235/85* (2013.01); *H01M 2008/1293* (2013.01); *Y02E 60/50* (2013.01); *Y02E 60/525* (2013.01)
USPC ............ 429/523; 429/400; 429/403; 501/126

(56) References Cited

U.S. PATENT DOCUMENTS

| | | | | |
|---|---|---|---|---|
| 4,849,254 | A * | 7/1989 | Spengler et al. | 427/115 |
| 5,021,304 | A * | 6/1991 | Ruka et al. | 429/485 |
| 5,350,641 | A | 9/1994 | Mogensen et al. | |
| 6,752,979 | B1 | 6/2004 | Talbot et al. | |
| 2003/0215378 | A1* | 11/2003 | Zhou et al. | 423/263 |
| 2004/0001994 | A1* | 1/2004 | Marina et al. | 429/40 |
| 2004/0018409 | A1* | 1/2004 | Hui et al. | 429/33 |
| 2004/0185327 | A1* | 9/2004 | Gorte et al. | 429/45 |
| 2005/0053819 | A1* | 3/2005 | Paz | 429/32 |
| 2005/0122300 | A1 | 6/2005 | Makuuchi et al. | |
| 2005/0250000 | A1 | 11/2005 | Marina et al. | |

FOREIGN PATENT DOCUMENTS

| | | |
|---|---|---|
| EP | 1 760 817 A1 | 3/2007 |
| WO | WO 2004/062006 A1 | 7/2004 |
| WO | WO 2005/122300 | 12/2005 |
| WO | WO 2006/116153 | 11/2006 |
| WO | WO 2007/025762 A2 | 3/2007 |

OTHER PUBLICATIONS

SynonymFor (Skeleton entry—web available Dec. 23, 2011 {http://www.synonymfor.com/skeleton}.*

P. Blennow et al. "Synthesis of Nb-doped $SrTiO_3$ by a Modified Glycine-Nitrate Process," *Journal of the European Ceramic Society*, vol. 27, pp. 3609-3612 (2007).

J. Qiao et al. "Ni/YSZ and Ni-$CeO_2$/YSZ Anodes Prepared by Impregnation of a Solid Oxide Fuel Cell," *Journal of Power Sources*, vol. 169, pp. 253-258 (2007).

M. Lundberg et al. "Mesoporous Thin Films of High-Surface-Area Crystalline Cerium Dioxide," *Microporous and Mesoporous Materials*, vol. 54, pp. 97-103 (2002).

C. Ho et al., "Morphology-Controllable Synthesis of Mesoporous $CeO2$ Nano- and Microstructures", Chem. Mater, Jul. 22, 2005, vol. 17, pp. 4514-4522.

* cited by examiner

CERIA AND STRONTIUM TITANATE BASED ELECTRODES

FIELD OF THE INVENTION

The present invention relates to solid oxide fuel cells (SOFC) comprising doped strontium titanate composite anodes. Particularly, the invention relates to ceramic anode structures containing an electronic conductive phase of doped strontium titanate and a ceria based oxide phase finely dispersed within the electronic conductive phase. More particularly, the invention relates to doped strontium titanate composite anodes containing a gadolinium-doped ceria phase (CGO) of nano-sized ceria crystallites dispersed therein and in which the dopant of the strontium titanate is niobium (Nb), vanadium (V) or tantalum (Ta).

BACKGROUND OF THE INVENTION

In order to be useful in fuel cells such as Solid Oxide Fuel Cells (SOFCs), anodes (fuel electrodes) must possess a high performance in terms of high electrochemical activity and high redox stability. Current state of the art Ni—YSZ anodes provide a reasonable electrochemical activity at high operating temperatures often above 80° C. but are normally not redox stable. Volume changes in Ni—YSZ anodes due to reduction and oxidation of Ni results in inexpedient mechanical stresses in the anode material which impair the performance of the fuel cell.

In "Synthesis of Nb-doped $SrTiO_3$ by a modified glycine-nitrate process", Journal of the European Ceramic Society, 2007 by Blennow et al. a method of preparing submicronic particles of Nb-doped strontium titanate for use in SOFC anodes is disclosed.

US-A1-2005/0250000 Marina et al. discloses an anode having two separate phases, one of doped strontium titanate and one of doped ceria; the ceria contains Nb, V, Sb or Ta. The strontium titanate phase is the more electronically conductive but has poor electrocatalytic activity. Ceria is on the other hand active in hydrocarbon oxidation but has poor electronic conductivity.

In "Ni/YSZ and Ni—CeO2/YSZ anodes prepared by impregnation of a solid oxide fuel cell", Journal of Power Sources, Qiao et al. disclose the preparation of Ni—$CeO_2$/YSZ anodes by tape casting and vacuum impregnation. The addition of $CeO_2$ is said to enhance cell performance.

U.S. Pat. No. 5,350,641 Mogensen et al. discloses the use of $CeO_2$-based ceramics as the anode in a fuel cell.

U.S. Pat. No. 6,752,979 Talbot et al. discloses the preparation of nano-sized ceria particles with templating surfactants. The removal of the surfactant and attendant formation of nano-sized particles having grain sizes of 2-10 nm is effected by calcination at e.g. 300° C.

In "Mesoporous thin films of high-surface-area crystalline cerium dioxide", Microporous and Mesoporous Materials 54 (2002), 97-103, Lunderg et al. disclose the formation of nano-sized ceria particles by the removal of templating surfactant during calcination at about 400° C.

WO-A-2006/116153 discloses a method of forming a continuous network of fine particles on the pore walls of a porous structure in a single step by removing the solvent of a solution containing a metal salt, surfactant and solvent prior to infiltration. The removal of the solvent is conducted by heating.

WO-A-2005/122300 describes metal supported anode structures manufactured from powder suspensions containing FeCr alloy, a layer for anode impregnation comprising ScYSZ and FeCr alloy, an electrolyte layer. The thus obtained half-cells are sintered and a solution of Ni, Ce, Gd nitrates is impregnated into the anode layer by vacuum infiltration thus resulting in an anode containing 40 vol % Ni. A cathode layer is subsequently deposited on the electrolyte surface. This application is, however, silent about the provision of nano-sized ceria particles within an electronically conductive phase of doped strontium titanate acting as anode support.

US-A1-2004/0018409 is concerned with the fabrication of a solid oxide fuel cell in which the anode, cathode and electrolyte are produced by thermal spraying. The anode may contain yttrium-doped strontium titanate. This application is, however, also completely silent about the provision through impregnation of nano-sized ceria particles within an electronically conductive phase of doped strontium titanate.

SUMMARY OF THE INVENTION

We have now found that unexpectedly high performance, i.e. high electrochemical activity at a wide range of temperatures (650-850° C.) is obtained with a novel ceramic electrode obtainable by a process in which nano-sized ceria particles are provided in a backbone structure of an electronically conductive phase of doped-strontium titanate.

Hence, according to the invention we provide a ceramic anode structure obtainable by a process comprising the steps of:

(a) providing a slurry by dispersing a powder of an electronically conductive phase and by adding a binder to the dispersion, in which said powder is selected from the group consisting of niobium-doped strontium titanate, vanadium-doped strontium titanate, tantalum-doped strontium titanate, and mixtures thereof, (b) sintering the slurry of step (a), (c) providing a precursor solution of ceria, said solution containing a solvent and a surfactant, (d) impregnating the resulting sintered structure of step (b) with the precursor solution of step (c), (e) subjecting the resulting structure of step (d) to calcination, and (f) conducting steps (d)-(e) at least once.

In a preferred embodiment, an electrolyte, i.e. an oxygen ion conducting phase such as yttrium stabilized zirconia (YSZ) is also provided by combining the electronically conductive component with said electrolyte. The invention encompasses therefore also a ceramic anode structure obtainable by a process comprising the steps of:

(a) providing a slurry by dispersing a powder of an electronically conductive phase and by adding a binder to the dispersion, in which said powder is selected from the group consisting of niobium-doped strontium titanate, vanadium-doped strontium titanate, tantalum-doped strontium titanate and mixtures thereof, (b) combining said slurry of the electronically conductive phase with an electrolyte, (c) sintering the obtained multilayer structure, (d) providing a precursor solution of ceria, said solution containing a solvent and a surfactant, (e) impregnating the resulting sintered multilayer structure of step (c) with the precursor solution of step (d), (f) subjecting the resulting structure of step (e) to calcination, and (g) conducting steps (e)-(f) at least once.

In one specific embodiment of the embodiment comprising the electrolyte, the slurry of the electronically conductive phase is applied on the electrolyte for instance by spray painting the electrolyte with the slurry. The electrolyte can be in the form of a pre-sintered YSZ tape, e.g. TZ8Y (Tosoh) with a proper thickness for instance about 100-200 µm.

In order to enable the provision of an anode supported cell, in another specific embodiment the electrolyte is preferably applied on the electronically conductive phase acting as current collector. The thus formed multilayer structure is sintered to get an anode supported structure where the electrolyte, e.g. TZ8Y (Tosoh), is in the form of a thin layer for instance about 10 µm, while the thickness of the anode support, i.e. the electronically conductive current collector phase is preferably much greater for instance 100 µm. Hence, in the embodiment comprising the electrolyte step (b) may comprise forming a layer of electronically conductive phase by tape-casting said slurry of the electronically conducting phase and applying the electrolyte thereon. The thus formed multilayer structure may then be subjected to sintering.

The electronically conductive phase in step (a) of any of the above embodiments (with or without electrolyte) may also contain initially an additional oxygen ion conducting phase, e.g. yttrium stabilized zirconia (YSZ) or mixed oxygen ion and electronically conducting phase e.g. Gd-doped ceria (CGO ($Ce_{1-x}Gd_xO_{2-\delta}$)). Thus, the electronically conductive phase may be provided with about 20-50 vol % YSZ (20-50 vol % 50/50 1 µm/7 µm YSZ) thereby forming a composite.

As used herein the term "multilayer structure" encompasses a structure containing two or more phases prior to impregnation and calcination. The multilayer structure may contain an electronically conductive phase combined with an electrolyte, or an electronically conductive phase and oxygen ion conducting phase combined with an electrolyte, or an electronically conductive phase and mixed oxygen ion and electronically conductive phase combined with an electrolyte.

As used herein the term "backbone structure" serves to define the electronically conductive phase of doped strontium titanate, optionally mixed initially with an oxygen ion conductive phase e.g. YSZ, or mixed oxygen ion and electronically conductive phase, e.g. CGO. It would be understood that while YSZ only conducts oxygen ions, CGO is a mixed conductor in reducing atmospheres such as those prevailing in the anode compartments of SOFCs.

As used herein the term "powder" defines a collection of particles with a mean particle diameter in the range 0.2-100 µm, preferably 0.1-10 µm, such as about 0.2, 0.5, 1.0 or 5 µm.

In this specification the terms "phase" and "component" are used interchangeably, thus an electronically conductive phase has the same meaning as electronically conductive component.

According to the invention, ceria particles are mixed with the multilayer structure as defined above, whereby a calcination step is conducted in order to in-situ form nano-sized ceria particles/crystallites that cover the surface of the multilayer structure and particularly the backbone structure containing the electronically conductive phase. Thus, the nano-sized ceria particles are finely dispersed within the multilayer structure thereby completely covering the surfaces of the particles therein.

By the term "in-situ" is meant during operation or as the process of preparation of the anode structure is being conducted.

By the term "nano-sized ceria particles or crystallites" is meant particles having grain size (average particle diameter) of 1-100 nm, preferably 1 to 50 nm for instance 5 to 40 nm such as 5 to 20 nm.

The impregnation, which is preferably conducted under vacuum to ensure the penetration of the ceria precursor solution containing a surfactant into the porosities of the multilayer structure and subsequent calcination of the sintered structure with the ceria precursor enables the incorporation of the resulting nano-sized ceria particles within the multilayer structure.

According to the invention, nano-sized ceria particles are formed by removal of a templating surfactant. The particles form a nano-sized surface structure which combined with the defect chemistry of doped-$SrTiO_3$ in which the dopant is Nb, Ta, or V, results in a surprisingly high electrochemical activity (low polarization resistance) at a wide range of temperatures as well as high redox stability.

In one embodiment of the invention the surfactant is selected from the group consisting of anionic surfactants, non-ionic surfactants, cationic surfactants and zwitterionic surfactants. Preferably, the surfactant is a non-ionic surfactant such as surfactants under the mark Pluronic P123 (BASF).

In a further embodiment the precursor solution of ceria contains gadolinium (Gd). The gadolinium serves as dopant and results after impregnation and calcination in the formation of nano-sized CGO ($Ce_{0.8}Gd_{0.2}O_{1.9}$) particles covering the surfaces of the particles in the multilayer structure. Other suitable dopants include Sm, Y and Ca and mixtures thereof. Accordingly, the precursor solution of ceria may contain a dopant selected from the group consisting of Gd, Sm, Y, Ca and mixtures thereof.

Cerium oxide doped with divalent or trivalent cations has been shown in the literature (e.g. Mogensen et. al. Solid State Ionics, 129 (2000) 63-94) to have sufficiently high ionic conductivity to make it attractive for SOFC applications. Many dopants such as alkaline, rare-earth oxides and $Y_2O_3$ have high solubility in the Ce sublattice. Replacing $Ce^{4+}$ with +3 or +2 cations results in the creation of anion vacancy sites to compensate charges in the lattice. To enable high conductivity, the selection of dopants is important. The highest ionic conductivities are obtained in lattices without strain, i.e. where the ionic radius of the dopant is as close as possible to the "matching" radius (e.g. Mogensen et. al. Solid State Ionics, 174 (2004) 279-286). Accordingly, Gd, Sm, Y, and to some extent Ca, are also suitable dopants for ceria ($CeO_2$).

The amount of dopant (Gd, Sm, Y, Ca) in the precursor solution of ceria is in the range of 5 wt % to 50 wt %, preferably 10 wt % to 40 wt %, depending on solubility and dopant.

By conducting the impregnation and calcination steps at least once, preferably up to five times, it is ensured that an increased amount of ceria penetrates and covers the particles in the multilayer structure.

In order to keep the ceria particles (crystallites) below about 20 nm, the calcination step is preferably conducted at temperatures of 650° C. or below, more preferably at 350° C. or below. To ensure calcinations, the temperature is kept for hold times of 0.5 hr or more, preferably more than 1 hr, such as 3 hr or 5 hr or 10 hr. The calcination may be conducted in an oxygen environment, preferably in air (about 20% v/v oxygen), but other atmospheres are also suitable, for instance in a $H_2/N_2$ atmosphere, containing for instance 9% v/v $H_2$ with $N_2$ as balance). Lower grain size (crystallite size) of the in-situ formed ceria particles and thereby higher BET surface area is achieved with lower calcination temperatures, relatively short hold times and oxygen containing atmospheres. Hence, in a preferred embodiment the calcination step is conducted at 350° C. for 4 hr in air, whereby ceria particles of about 5 nm are formed. The smaller the ceria particles the finer becomes their dispersion in particularly the backbone structure of the anode containing the electronically conductive phase and optionally initially mixed with for instance an oxygen ion conducting phase. In addition, lower temperatures, for instance about 250° C. can speed up the calcination procedure and thereby facilitate faster impregnation cycles, meaning that multiple impregnations are possible within a smaller time scale. The time spent in the overall preparation process may be reduced significantly.

The anode structure of the invention is superior to conventional Ni—YSZ anode structures. Additionally, the provision of Ni-metal catalyst in the anode may be completely omitted or at least substantially reduced. Hence, with the present invention a full ceramic fuel electrode can be fabricated without any metal catalyst e.g. Ni or any similar active metal. Only small amounts of metal catalysts in the range of a few wt %, for instance less than about 10% of the anode weight may be used to further improve the performance.

In one embodiment of the invention the process further comprises combining the precursor solution of ceria with a nickel precursor solution and wherein the total amount of nickel in resulting anode is below 10 wt %. The nickel precursor solution is preferably an aqueous solution of nickel for instance $Ni(NO_3)_2 \cdot 6H_2O$. The amount of Ni in the resulting anode structure is advantageously 0.05-10 wt % such as 1-5 wt % or 5-10 wt %. The provision of small amounts of nickel (below 10 wt % Ni in the resulting anode) improves performance in terms of a higher electrochemical activity, particularly at temperatures between 650 and 850° C. This contrasts the anodes according to the prior art, where the amount of Ni in the resulting anode can be much higher, such as 40 wt % or even higher. High amount of Ni results in nickel particles which upon sintering coalesce and thereby create the nickel coarsening that is responsible for the higher degradation or loss of activity of cell during time. By having small amounts of nickel the nickel particles are isolated from each other and rather work as a sort of catalytic aid centers in the CGO phase As used herein the term "resulting anode" represents the backbone structure, i.e. in includes the electronically conductive phase of doped strontium titanate, optionally mixed initially with the oxygen ion conductive phase, e.g. YSZ, or mixed oxygen ion and electronically conductive phase e.g. CGO. But it does not include the electrolyte.

A precursor solution of Ni can also be made separately in a similar manner as the doped ceria solution (nickel solution containing surfactant and solvent). The impregnation with the precursor solution of nickel can then be conducted as a separate step after the ceria impregnation.

During the process of preparation of the precursor solution of ceria containing a solvent and a surfactant, solutions containing cerium and gadolinium may be mixed first with a suitable solvent such as ethanol. For example ethanol solutions of cerium nitrate and gadolinium nitrate may be prepared separately. The surfactant, preferably Pluronic P123, may then be dissolved in the cerium nitrate solution or in a combined solution of cerium and gadolinium nitrate at for instance room temperature.

Two solutions can be made separately, one with the cerium and gadolinium nitrates and one with the Pluronic 123 surfactant. The solutions can be mixed when the species are completely dissolved in the solvents. Not only ethanol can be used as solvent; other solvents or mixtures of solvents that can dissolve the nitrates and the surfactant can be used e.g. water.

In order to improve the wetting of the precursor solution of ceria upon impregnation of the sintered structure, one or more additional surfactants may be added to the surfactant-ceria nitrate solution or surfactant-cerium and gadolinium nitrate solution. The one or more additional surfactant is preferably a non-ionic surfactant different from the first surfactant (Pluronic P123) such as Triton X-45 or Triton X-100.

In yet another embodiment of the invention the amount of Nb-doped $SrTiO_3$ represents 50-80% of the weight of the anode and the infiltrated ceria phase 20-50% of the weight of the anode. Preferably, the amount of Nb-doped $SrTiO_3$ represents about 75% of weight of the anode and the infiltrated ceria phase about 25% of the weight of the anode (resulting anode as defined above).

It would be understood that after calcination, the ceria based oxide phase consists of a network of crystalline or semi-crystalline nano-sized crystallites, for instance in the range of 5 nm after calcination in air at 350° C. for 4 h. These crystallites cover the surface of the particles of the multilayer structure. This special surface structure in combination with the tailored defect chemistry of doped $SrTiO_3$ and preferably Nb-doped $SrTiO_3$ is believed to cause the high electrochemical activity of the anode.

When measured on symmetrical cells at open circuit voltage (OCV) in a one-atmosphere set-up, the electrochemical activity is maintained or even improved compared to the current state of the art Ni—YSZ fuel electrode in solid oxide fuel cell applications. Due to the apparently low activation energy of the electrode (around 0.7 eV), the performance is maintained at lower operating temperatures as well. In other words, the sensitivity to temperature changes is reduced and performance is kept at a wide range of temperatures (650-850° C.).

As used herein the term "symmetrical cell" corresponds to a cell where the electrode material is applied onto both sides of a pre-sintered electrolyte material. The measurements are performed in a one-atmosphere set-up where the gas composition and temperature can be varied accordingly. Further, the electrode composition has been shown to be redox stable. The redox stability is particularly improved compared to currently used Ni—YSZ electrodes. As a result of the higher redox stability the novel composite anode structure is more robust to changes in the surrounding atmosphere and will not expand or contract as much upon oxidation/reduction. The various manufacturing techniques currently used for fabricating electrodes for solid oxide fuel cells, or similar applications can be used. The novel composite anode structure may supplement or replace currently used fuel electrodes (anodes) in solid oxide fuel cells (SOFC) and cathodes in solid oxide electrolysis cells (SOEC). The invention encompasses therefore solid oxide fuel cells (SOFC) comprising the anode structure of the invention as set out in claim 11. Thus, when used in SOFC the anode structure itself does not contain the electrolyte. Of course, in order to have a SOFC, apart from the anode structure itself of claim 1, an electrolyte and a cathode layer are also required. A SOFC stack may then be assembled which comprises a plurality of such SOFCs.

The doped $SrTiO_3$ can be used as the current collector layer and/or it can be used as electrode support layer due to its high electrical conductivity. The high electrical conductivity enables the production of an anode-supported SOFC using the doped $SrTiO_3$ as the anode support.

The anode structure of the invention may also be used as electrode in other applications than fuel cells where the anode (and cathode) may work differently than in fuel cells. Such applications include electrolysis cells and separation membranes. We provide therefore also the use of the anode structure prepared according to the invention as electrode in oxygen separation membranes, hydrogen separation membranes, electrolysis cells and electrochemical flue gas cleaning cells as set out in claim 12.

DETAILED DESCRIPTION OF THE INVENTION

Figure 1:
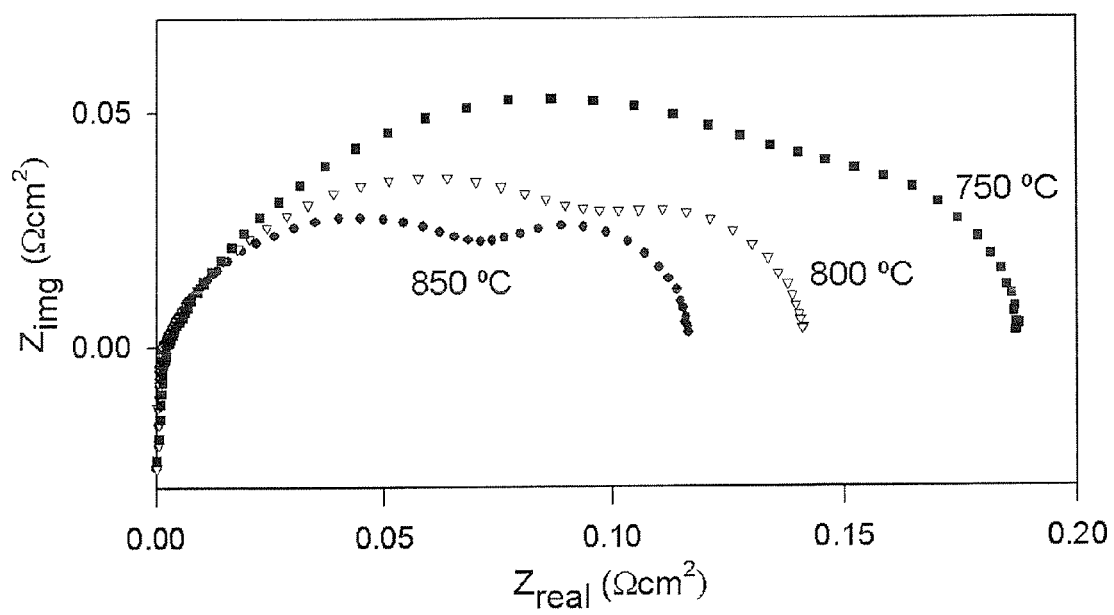
FIG. 1 shows electrical impedance spectroscopy (EIS) spectra on symmetrical cells with the anode of the invention as the electrodes. The spectra have been corrected for the resistance from the electrolyte.

Electrical impedance spectroscopy (EIS) measurements on symmetrical cells were performed with the novel all ceramic anode as the electrodes. Typical impedance spectra are shown in FIG. 1. The data represent measurement in humidified $H_2$ (approximately 3% $H_2O$) at various temperatures.

Similar measurements as in FIG. 1 were performed at temperatures between 600-850° C. The electrode polarization resistance ($R_P$) has been compared with similar measurements with the current state-of-the-art Ni—YSZ fuel electrode. The Ni—YSZ electrodes were applied to a similar pre-sintered YSZ electrolyte tape from the same fabrication batch. The results are therefore comparable. In order to get a better understanding of the surprisingly high electrochemical performance of the novel ceramic electrode, measurements were also made on single component Nb-doped $SrTiO_3$ electrodes and on electrodes with Nb-doped $SrTiO_3$/YSZ composite structure. The polarization resistance ($R_P$) at various temperatures for the different electrode compositions is shown in Table 1.

Table 1. Polarization resistance ($R_P$) in $\Omega cm^2$ for different electrode compositions measured with symmetrical cells with same pre-sintered electrolyte (200 µm YSZ) batch. STN=$Sr_{0.94}Ti_{0.9}Nb_{0.1}O_3$, CGO=$Ce_{0.8}Gd_{0.2}O_{1.9}$ (impregnated). LT=initial measurements at 650° C. before the temperature was raised to 850° C. Measurements were done in humidified $H_2$ (approximately 3% $H_2O$).

TABLE 1

| Electrode | 650° C. (LT) | 850° C. | 800° C. | 750° C. | 700° C. | 650° C. | 600° C. |
| --- | --- | --- | --- | --- | --- | --- | --- |
| STN | — | 163 | — | 670 | — | — | — |
| STN/YSZ | — | 36 | 94 | 245 | — | — | — |
| Ni-YSZ | — | 0.125 | — | 0.274 | — | 0.821 | — |
| STN/CGO (1st series) | — | 0.115 | 0.141 | 0.188 | 0.275 | 0.44 | 0.74 |
| STN/CGO (2nd series) | 0.26 | 0.138 | 0.186 | 0.261 | 0.388 | 0.61 | — |
| STN/CGO-Ni | 0.22 | 0.062 | 0.08 | 0.11 | 0.17 | 0.3 | — |

From Table 1 it is clear that the new ceramic electrode performs similar to the Ni—YSZ electrode at 850° C. but has higher performance at lower temperatures due to a surprisingly low activation energy (approximately 0.7 eV). These results are based on symmetrical cell measurements at open circuit voltage (i.e. no polarization) when the electrodes have had the same pre-sintered YSZ tape as electrolyte. All samples with CGO were impregnated three times and calcined in air at 350° C. for 4 hours after each impregnation. The difference in performance between the two different STN/CGO sample series is believed to be a lower amount of CGO in the second series.

STN/CGO—Ni was an electrode with Nb-doped $SrTiO_3$ backbone that was impregnated 3 times with CGO (similar to the other cells) and then a final time with a Ni-precursor solution. The total amount of Ni in the electrode, here anode structure without electrolyte, was less then 10 wt % approximately 5-10 wt %. Addition of small amount of Ni to the electrode improved the performance. Without being bound by any theory it is believed that the ceria phase is still the main electrocatalytically active component. Ni may improve the catalytic performance to some extent but mainly improves the removal and/or distribution of electrons to and from the ceria particles and the electronically conductive Nb-doped $SrTiO_3$ phase.

Figure 2:
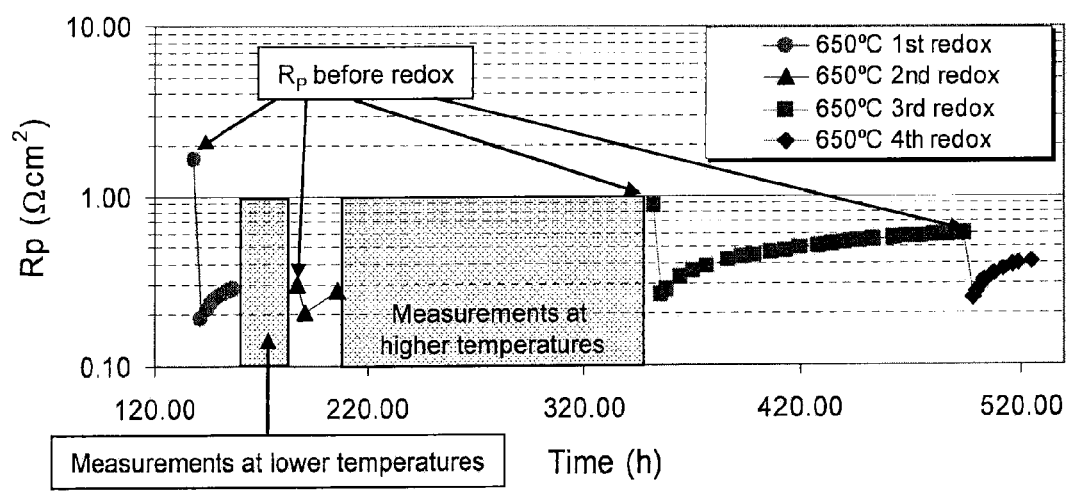
FIG. 2 shows a polarization resistance ($R_P$) behaviour graph during redox cycles of the anode of the invention measured on symmetrical cells.

Another very surprising result was the redox stability of the present ceramic electrode. FIG. 2 shows how the polarization resistance ($R_P$) is affected by conducting a redox cycle. The arrows indicate the initial $R_P$ prior to a redox cycle. The remaining data points illustrate how $R_P$ evolves after the redox cycle. The shaded areas show that various measurements were conducted between the redox cycles.

A redox cycle in this context means that the fuel gas (humidified $H_2$) was abruptly changed to air. The samples were exposed to air at 650° C. for about 1 h to be sure that the samples were completely oxidized (the $P(O_2)$ was simultaneously measured in-situ). The gas was then switched back to humidified $H_2$ again and when a stable $P(O_2)$ was reached the polarization resistance was measured over some time.

FIG. 2 shows that even if $R_P$ initially was relatively high (>1 $\Omega cm^2$) for this sample series, the polarization resistance initially decreased by a factor of 10 (from 1.66 to 0.19 $\Omega cm^2$) after the first redox cycle at 650° C. This reactivation and stability towards redox cycles is a very valuable feature. This phenomenon has been repeated on three different sample series with similar result which shows that the process and the surprising results are reproducible.

Figure 3:
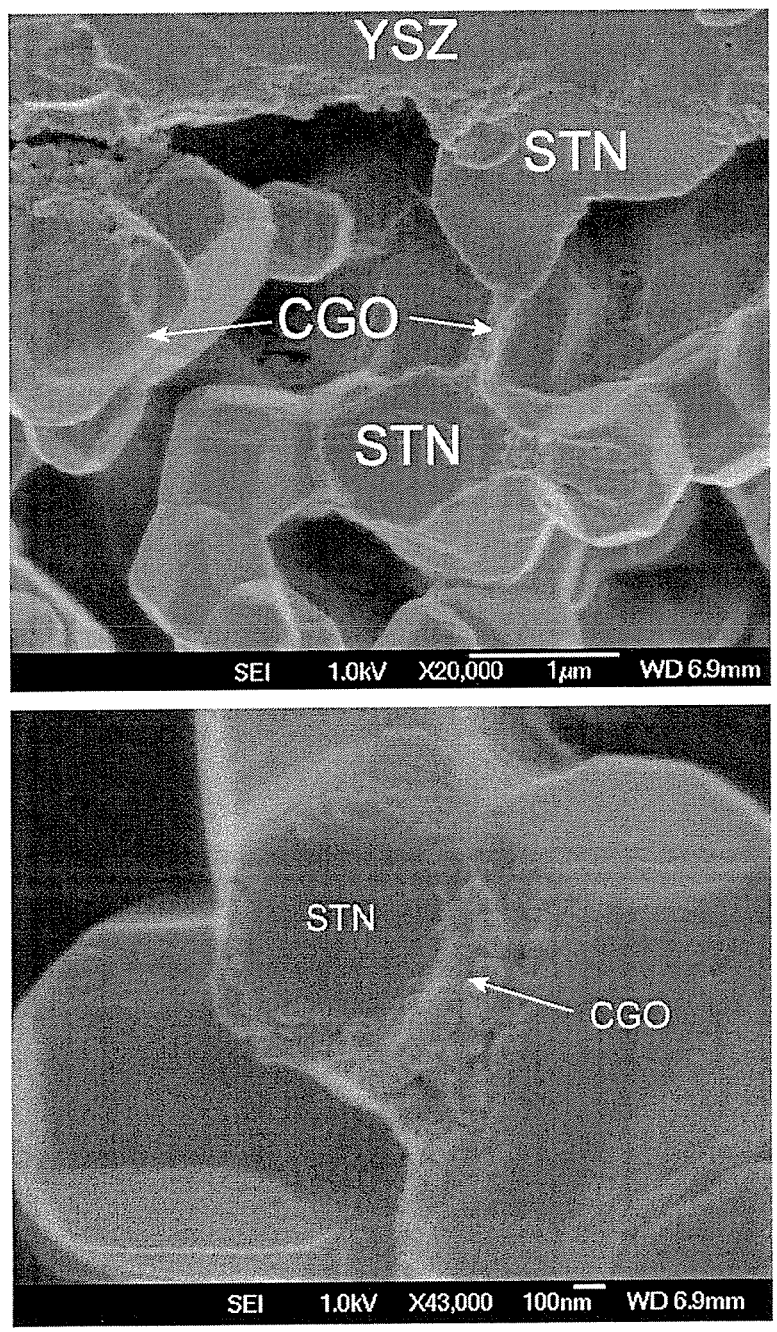
FIG. 3 shows Scanning Electron Microscopy (SEM) images of a fractured surface of the CGO impregnated backbone structure of Nb-doped $SrTiO_3$ (STN).

The SEM images of FIG. 3 show how well distributed the CGO particles are. The solid part in the top of the top image is the YSZ electrolyte. The nano-sized CGO particles completely cover all the Nb-doped $SrTiO_3$ particles in the porous microstructure all the way into the electrolyte. The CGO particles are seen as the thin layer (50-100 nm) covering all the larger Nb-doped $SrTiO_3$ particles. The images were taken after three impregnations and calcination at 350° C. in air for 4 h between each impregnation, but before electrochemical testing.

XRD was performed on symmetrical cells consisting of YSZ as the electrolyte and Nb-doped $SrTiO_3$ as the backbone structure which had been impregnated with the CGO solution three times and calcined at 350° C. in air for 4 h between each impregnation. The cells were then further heated to various temperatures between 650° C. and 850° C. and in different atmospheres (either air or 9% H2/N2) for 48 h. From the difference in peak broadening of the CGO peaks in the diffractograms, it was found that the temperature has an effect on the particle size of the calcined CGO phase. The average grain size $d_{avg}$ of the CGO phase was calculated from the XRD diffractograms using Scherrer's Eq. (1):

$$d_{avg} \approx \frac{\kappa \cdot \lambda}{\beta \cdot \cos(\theta)} \quad (1)$$

where $\kappa$, $\lambda$, $\beta$, and $\theta$ are the shape factor (taken as 0.9), the wave length of the Cu $K_\alpha$ radiation (1.54056 Å), the full width at half maximum (FWHM) of the (1 1 1) reflection (at approximately 28.5° 2Θ), and the Bragg angle of the (1 1 1) reflection, respectively. The average grain size is shown in Table 2.

Nitrogen adsorption/desorption experiments (BET) were also conducted on the same samples in order to determine the specific surface area (SSA), and how it is affected by different temperatures and atmospheres. The specific surface area results are also displayed in Table 2. For comparison, single component Nb-doped $SrTiO_3$ has a SSA of approximately 11 $m^2/g$.

Table 2. Calculated grain size of the CGO particles from XRD together with BET specific surface area (SSA) of the samples with 76 wt % Nb-doped $SrTiO_3$ and 24 wt % CGO. Total calcination time shown in brackets.

TABLE 2

| Temperature (° C.) | Atmosphere | Grain size (nm) | SSA ($m^2/g$) |
|---|---|---|---|
| 350 (12 h) | Air | 5 | 54.5 |
| 650 (48 h) | Air | 12 | 19.6 |
| 650 (48 h) | 9% $H_2/N_2$ | 16 | 12.3 |
| 850 (48 h) | 9% $H_2/N_2$ | 38 | 7.8 |

Figure 4:
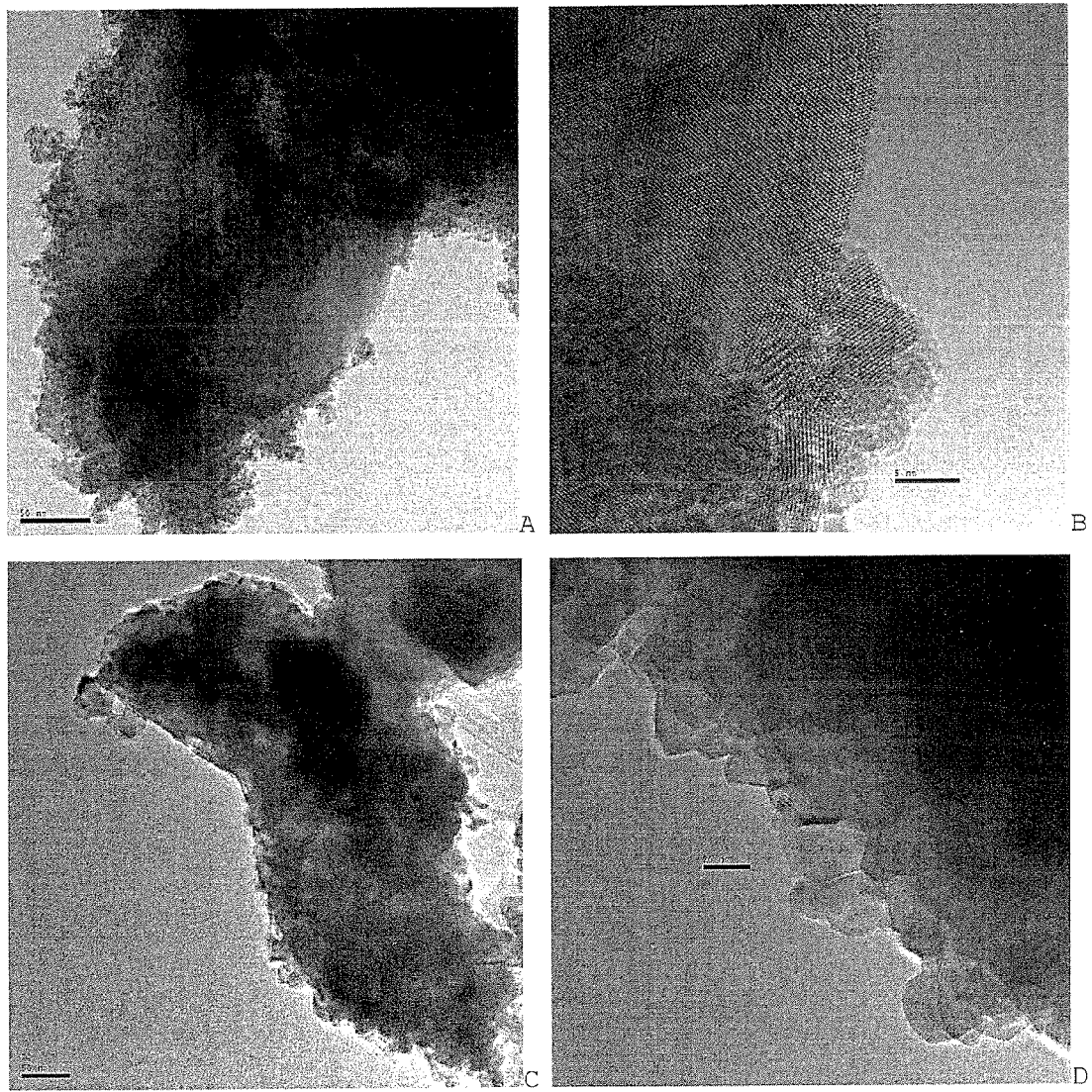
FIG. 4 shows Transmission Electron Microscopy (TEM) images of calcined samples of the CGO impregnated backbone structure of Nb-doped $SrTiO_3$.

The samples calcined at 350° C. in air (after impregnation three times) and at 650° C. in 9% $H_2/N_2$ were also investigated with TEM. TEM micrographs of the samples are shown in FIG. 4, where A) and B) represent samples after impregnation three times and calcination in air at 350° C. for a total of 12 hrs (4 h after each impregnation). C) and D) represent samples after further heat treatment at 650° C. in 9% H2/N2 for 48 hr. Scale bars: A) 50 nm, B) 5 nm, C) 50 nm, D) 20 nm. In all micrographs the Nb-doped $SrTiO_3$ phase is represented by the much larger particles and the CGO by the small nano crystals. The TEM images confirm the grain size calculations from XRD. After calcination at 350° C. the average CGO grain size is approximately 5 nm (see FIG. 4. A-B) and after calcination at 650° C. in 9% $H_2/N_2$ for 48 h the average grain size appears to be around 20 nm (see FIG. 4. C-D).

Figure 5:
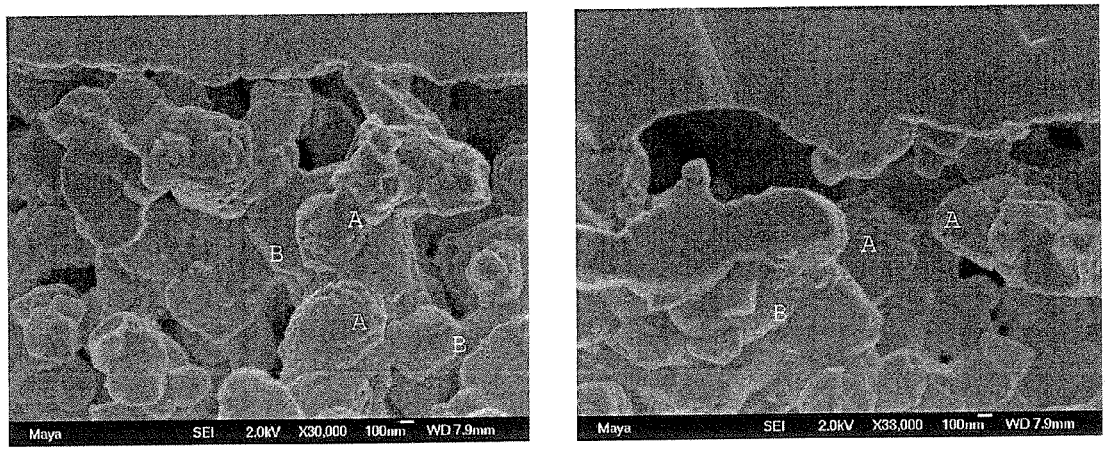
FIG. 5 shows SEM images of fractured surfaces of tested symmetrical cells of a composite backbone structure of Nb-doped $SrTiO_3$ and YSZ impregnated with CGO.

The surprisingly high electrochemical activity appears to be related to interface energy, by which we obtain the right kind of active facets of the formed ceria nano crystals in great numbers. Evidence of that the ceria nano crystals has a different morphology on various materials is seen in FIG. 5. Here a composite backbone structure containing both Nb-doped $SrTiO_3$ and YSZ has been impregnated with the ceria solution and tested in wet $H_2$ at a maximum temperature of 850° C. A) corresponds to areas where CGO grains cover YSZ particles and B) corresponds to areas where CGO covers Nb-doped $SrTiO_3$ particles. There is a marked difference in morphology of the CGO particles on the different backbone particles. The solid part on the top of the micrographs is the YSZ electrolyte. Since YSZ and ceria have similar crystal structure (fluorite structure) the ceria phase will tend to smear out over the YSZ surface. Nb-doped $SrTiO_3$ has a perovskite structure and the interface energy will therefore be different in the titanate/ceria interface compared to the YSZ/ceria interface. The morphology of the ceria will be different on the Nb-doped $SrTiO_3$ and more electrochemically active facets become exposed.

EXAMPLES

Example 1

The following procedure was used to fabricate the infiltration solution which was used to fabricate an all ceramic SOFC anode.

1. An ethanol solution (ca: 10 g ethanol) containing 0.8 moles/liter cerium nitrate and 0.2 moles/liter gadolinium nitrate was prepared.
2. 1 g Pluronic P123 surfactant was dissolved in the nitrate solution at room temperature.
3. (Optional) Two solutions can be made separately. One with the cerium and gadolinium nitrates and one with the Pluronic P123 surfactant. The solutions can be mixed when the species are completely dissolved in the solvents. Not only ethanol can be used. Other solvents (or mixtures of solvents) that can dissolve the nitrates and the surfactant can be used (e.g. water).
4. (Optional) Extra surfactant (e.g. Triton X-45 or Triton X-100) can be added to improve the wetting of the infiltration solution. In one experiment approximately 0.3 g Triton X-100 was added to the nitrate and Pluronic P123 solution.
5. A backbone of a porous, electronically conductive phase is fabricated. The electronically conductive phase consists of Niobium (Nb)-doped SrTiO3 (nominal composition=$Sr_{(1-x/2)0.99}Ti_{1-x}Nb_xO_3$). Vanadium (V) or Tantalum (Ta) can also be used instead of Nb in the strontium titanate material.
6. A slurry for the backbone material was made by dispersing powders of Nb-doped $SrTiO_3$. A binder was added after dispersion and the slurry was spray painted on a presintered YSZ tape (TZ8Y (Tosoh), 200 μm thick).
7. After spray painting of an electrode layer the half cell was sintered in air or in a mixture of $H_2/N_2$ at 1200-1300° C.
8. After the anode backbone structure has been fabricated, the prepared infiltration solution is impregnated into the open porosities of the anode backbone material. The infiltration is made under vacuum.
9. After infiltration the cell is calcined at 350° C. in air. The heat treatment removes the surfactant and forms the desired oxide ($Ce_{0.8}Gd_{0.2}O_{1.9}$).
10. (Optional) Step 8-9 is repeated multiple times to increase the amount of doped cerium oxide phase.

These steps provide a novel composite all ceramic anode structure. The resulting doped ceria phase has a high surface area (see Table 2) and comprise of grains of approximately 5 nm in diameter on average after calcination at 350° C. (see Table 2). The final ceramic composite structure consists of two phases: one electronically conducting phase and one mixed electronic ionic conducting phase with high catalytic activity. The novel composite structure provides high electronic conductivity in reducing atmosphere (from the doped strontium titanate) and shows high electrochemical activity as a fuel electrode in solid oxide fuel cells.

Example 2

Same method as Example 1, but where Step 6 is slightly changed: the slurry in Step 6 comprised Nb-doped $SrTiO_3$ and 8-mole yttria stabilized zirconia in a volume ratio of approximately 1:1.

Example 3

Same method as Example 1, but where Step 6 is slightly changed: the slurry in Step 6 comprised Nb-doped $SrTiO_3$ and Gd-doped $CeO_2$ in a volume ratio of approximately 1:1.

The invention claimed is:

1. A ceramic anode structure obtainable by a process comprising the steps of:
   (a) providing a slurry by dispersing a powder of an electronically conductive phase and by adding a binder to the dispersion, in which said powder is selected from the group consisting of niobium-doped strontium titanate, vanadium-doped strontium titanate, tantalum-doped strontium titanate and mixtures thereof;
   (b) sintering the slurry of step (a) to provide a backbone structure to said electronically conductive phase;
   (c) providing a precursor solution of ceria, said solution containing a solvent and a surfactant;
   (d) impregnating the resulting sintered structure of step (b) with the precursor solution of step (c) to ensure penetration of the ceria precursor solution containing the surfactant into porosities of the resulting sintered structure of step (b);
   (e) subjecting the resulting structure of step (d) to calcination to form nano-sized ceria particles or crystallites that are finely dispersed within the anode structure to completely cover the surfaces of all sintered structure particles of the anode structure, and cover the surface of said backbone structure, and to enable incorporation of the nano-sized ceria particles within the formed anode structure so that the nano-sized ceria particles or crystallites form a layer completely covering all the sintered structure particles of the anode structure; and
   (f) conducting steps (d)-(e) at least once.

2. A ceramic anode structure obtainable by a process comprising the steps of:
   (a) providing a slurry by dispersing a powder of an electronically conductive component and by adding a binder to the dispersion, in which said powder is selected from the group consisting of niobium-doped strontium titanate, vanadium-doped strontium titanate and tantalum-doped strontium titanate;
   (b) combining said slurry of the electronically conductive phase with an electrolyte;
   (c) sintering the obtained multilayer structure to provide a backbone structure to said electronically conductive phase;
   (d) providing a precursor solution of ceria, said solution containing a solvent and a surfactant;
   (e) impregnating the resulting sintered multilayer structure of step (c) with the precursor solution of step (d) to ensure penetration of the ceria precursor solution containing the surfactant into porosities of the resulting sintered structure of step (b);
   (f) subjecting the resulting structure of step (e) to calcination to form nano-sized ceria particles or crystallites that are finely dispersed within the anode structure to completely cover the surfaces of all sintered structure particles of the anode structure, and cover the surface of said backbone structure, and to enable incorporation of the nano-sized ceria particles within the formed anode structure so that the nano-sized ceria particles or crystallites form a layer completely covering all the sintered structure particles of the anode structure; and
   (g) conducting steps (e)-(f) at least once.

3. Anode structure according to claim 2, in which step (b) comprises forming a layer of electronically conductive phase by tape-casting said slurry of the electronically conducting phase and applying the electrolyte thereon.

4. Anode structure according claim 1, wherein the electronically conductive phase in step (a) also contains initially an additional oxygen ion conducting phase, or mixed oxygen ion and electronically conducting phase.

5. Anode structure according to claim 1, wherein the surfactant is selected from the group consisting of anionic surfactants, non-ionic surfactants, cationic surfactants and zwitterionic surfactants.

6. Anode structure according to claim 5, wherein the surfactant is a non-ionic surfactant.

7. Anode structure according to claim 1, wherein the precursor solution of ceria contains a dopant selected from the group consisting of Gd, Sm, Y, Ca and mixtures thereof.

8. Anode structure according to claim 1, wherein the impregnation and calcination steps of the sintered structure are conducted up to five times.

9. Anode structure according to claim 1, wherein the calcination step is conducted in air at a temperature of 250° C. or below.

10. Anode structure according to claim 1 further comprising combining the precursor solution of ceria with a nickel precursor solution and wherein the total amount of nickel in the resulting anode is below 10 wt %.

11. Solid oxide fuel cell comprising an anode structure according to claim 1.

* * * * *